United States Patent [19]
Brunner et al.

[11] 3,983,262
[45] Sept. 28, 1976

[54] AUTOMATIC FORTUNE COOKIE FOLDING METHOD

[75] Inventors: Ronald H. M. Brunner, Salt Lake City; Billy M. Jensen, Sandy; Lang S. Wong, Salt Lake City, all of Utah

[73] Assignee: China Bazaar, Inc., Salt Lake City, Utah

[22] Filed: July 14, 1975

[21] Appl. No.: 595,873

Related U.S. Application Data

[62] Division of Ser. No. 469,617, May 13, 1974, Pat. No. 3,894,829.

[52] U.S. Cl. .................................. 426/502; 99/354
[51] Int. Cl.[2] .......................................... A21D 6/00
[58] Field of Search .................. 426/502, 512, 514; 99/353, 354, 450.1; 425/383, 500, 515, 518

[56] References Cited

UNITED STATES PATENTS

| | | | |
|---|---|---|---|
| 3,265,016 | 8/1966 | Cheung | 99/353 |
| 3,420,194 | 1/1969 | Schafer | 99/450.1 |
| 3,605,642 | 9/1971 | Brown | 99/354 |

*Primary Examiner*—S. Leon Bashore
*Assistant Examiner*—Marc L. Caroff
*Attorney, Agent, or Firm*—Robert E. Krebs

[57] ABSTRACT

Flat circular wafers are folded into the shape characteristic of fortune cookies in a machine which includes a turntable whereon a flat wafer is located and carried to a predetermined position, a reciprocating plunger operable to press the wafer through a pair of gates which define a slot below the predetermined position thereby to make a first fold in the wafer along its diameter so that it has a semicircular shape, two pairs of pincers which grasp the once-folded wafer at opposite ends of the first fold line, and means to operate the pincer pairs to move toward one another to bring the midpoint of the first fold line against a stationary edge and to make the second fold over that edge, and a pair of juxtaposed endless belts that grip the twice-folded wafer on edge therebetween and carry it to discharge. Also, a device is described for laying a fortune slip on the flat wafer after it is located on the turntable.

5 Claims, 16 Drawing Figures

AUTOMATIC FORTUNE COOKIE FOLDING METHOD

This is a division of application Ser. No. 469,617 filed May 13, 1974, now U.S. Pat. No. 3,894,829.

BACKGROUND OF THE INVENTION

1. Field of the Invention

This invention relates generally to apparatus for manufacturing of baked foods and, more specifically, to an automatic device for folding fortune cookies.

2. State of the Art

A fortune cookie is a specialty food which may be best described as a baked wafer which has been folded into a complex shaped. The general ingredients of fortune cookies are water, flour, sugar, shortening and vanilla flavoring which are combined according to various receipes known to workers in the art. Usually, the mixed ingredients are poured into special circular molds which are then heated in order to bake thin flat wafers which are subsequently folded while still warm and pliant. The characteristic fortune cookie configuration is usually accomplished by first folding the circular wafer once on a diameter and then again about a line which is perpendicular to the plane of the folded article through the midpoint of the first fold line. The final shape is unique and is well suited for encompassing and containing a slip of paper having a "fortune" printed thereon from whence the cookie derives its name.

Although several machines have been proposed for automatically folding fortune cookies, the conventional method of production is still to fold the wafers tediously by hand. Examples of proposed folding machines can be found in U.S. Pat. Nos. 3,605,642 and 3,265,016. In order for an automatic machine to be satisfactory in practice, the machine must operate quickly enough to acieve an economical production rate but must also operate without breaking or tearing the wafers. A particular difficulty with the automatic folding of fortune cookies arises because the warm wafers are surprisingly resilient. Accordingly, the folding machine must hold the folded cookies gently in shape until they have cooled, or else they unfold.

BRIEF SUMMARY OF THE INVENTION

The present invention comprises an automatic device for folding fortune cookies that not only satisfies the aforementioned requirements and provides an improvement over the shortcomings of the prior art but, also, provides additional advantages as will be made clear hereinafter. Among the objects of the present invention, the most important is to provide improved ways and means for quickly and automatically folding a flat circular wafer into the shape characteristic for a fortune cookie. An auxiliary object is to provide improved ways and means for holding the cookie until it cools sufficiently to retain its shape unaided.

These and other objects and advantages of the present invention may be readily ascertained by reference to the following description and appended illustration which are offered by way of example only and not in limitation of the invention, whose scope is defined in the appended claims and by equivalents to the structure, material and functions described in the specification.

DETAILED DESCRIPTION OF THE PREFERRED EMBODIMENT

Figure 1:
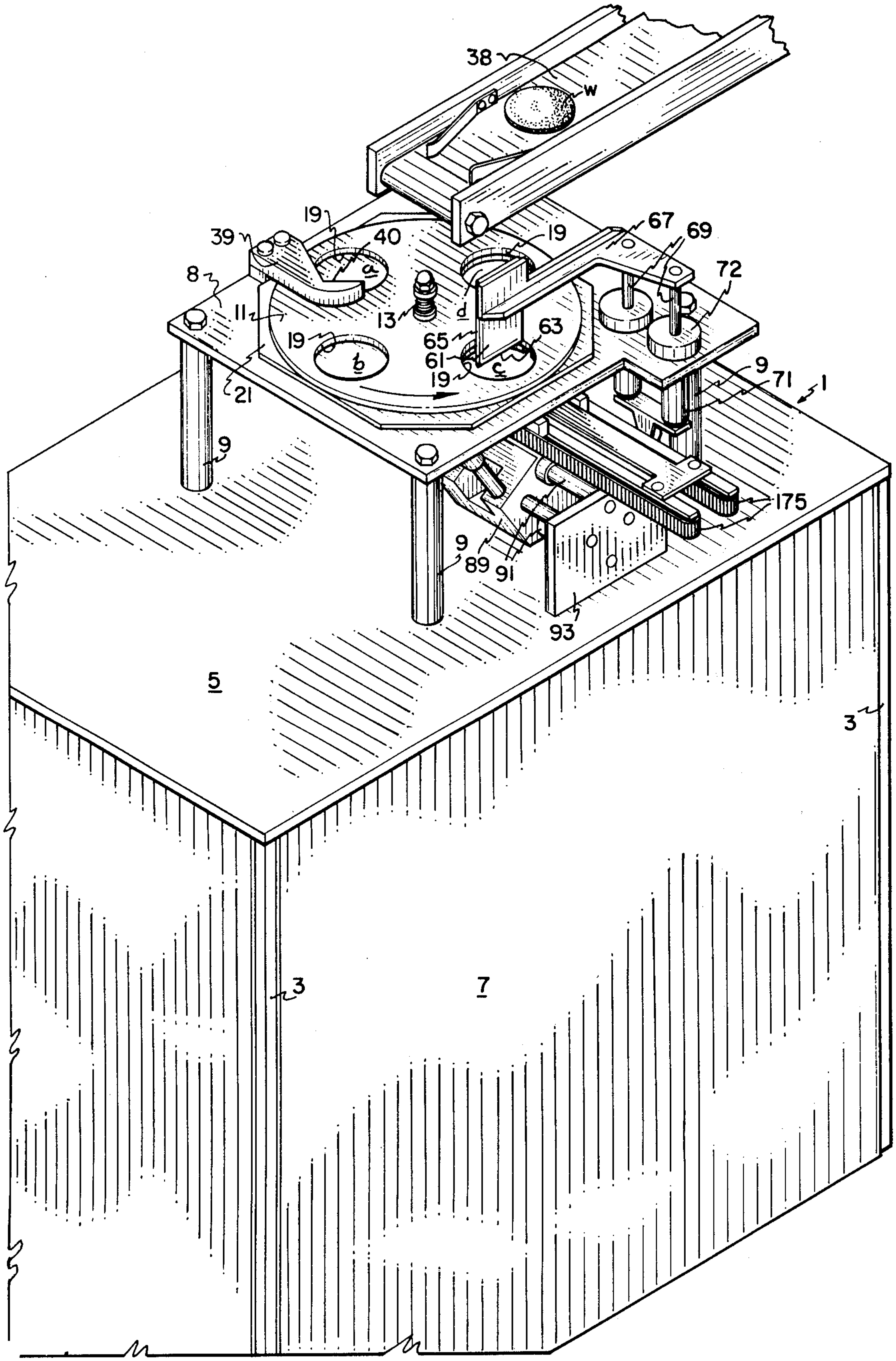
FIG. 1 is aa pictorial view of one embodiment of a machine according to the invention.

The automatic folding device illustrated in FIG. 1 is supported by a box-like stationary main frame, generally designated by the numeral 1, which includes support legs 3 and a rigid top cover 5. The main frame is shown as being enclosed by protective slide panels 7 in FIG. 1, but those panels are removed in the subsequent drawings to expose various drive cams, linkages and so forth. On the top of the main frame is a secondary frame that includes an upper horizontally-disposed platform 8 which is supported on legs 9 that are fixedly attached to the top 5 of the main frame.

Supported above the platform 8 is a horizontally-disposed turnable 11 which is keyed to a concentrically-disposed spindle 13 that is journaled for rotation in the direction indicated by the curved arrow. The turnable 11 preferably is a thin circular plate whose faces are flat and smooth. As shown in both FIGS. 1 and 2, a plurality of identically shaped apertures 19 are formed through the turntable slightly inward of its periphery and are spaced apart at regular circumferential intervals so that all the apertures together form a regular verticil which is concentric with the spindle 13. The apertures 19 are constructed and arranged to hold the flat baked wafers *w* (see FIG. 10*a*). In practice, the apertures 19 are generally about three inches in diameter, being slightly larger than the wafers. The underface of the turntable 11 slides over a smooth flat plate 21 which is quite thin and is stationarily fixed to the platform 8 to serve as a support surface for the wafers that lie in the apertures 19. Both the turnable and support plate are preferably made from Teflon or a similar slippery material. Although the support plate 21 is illustrated as distinct from the platform 8, they can be fabricated as a single piece.

In operation, the turntable 11 does not rotate continuously; rather, it is sequentially "indexed" through a predetermined angle and then stopped before being turned again. The duration of the pause is determined by the cycling time of the folding mechanism which will be described hereinafter. The magnitude of the angle through which the turntable is indexed depends upon the number of apertures 19 which form the verticil. Since the illustrated turntable has four apertures, it is indexed one-quarter turn after each cycle of the folding mechanism; the four exactly predetermined positions of where the apertures successively pause are designated as stations *a*, *b*, *c* and *d*, respectively, in FIG. 2.

Figure 3:
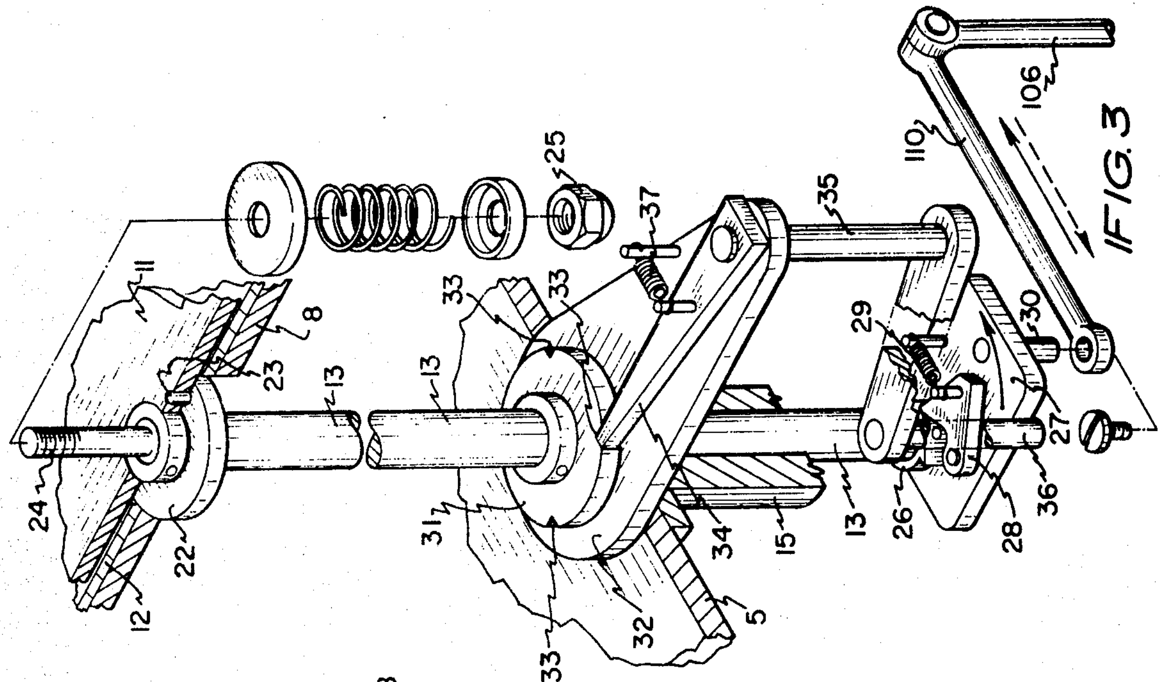
FIG. 3 is a partially exploded pictorial view of a detail mechanism of the machine of FIG. 1, the mechanism being drawn to an enlarged scale and broken away in places for purposes of clarity.

In FIG. 3, the spindle 13 is shown in detail as well as the mechanism which indexes the turntable by selectively rotating the spindle. The illustrated spindle is journaled and supported for rotation by a cylindrical collar 15 that is fixed around an aperture formed for the spindle through the top 5 of the main frame. Fixedly keyed to the upper end of the spindle is an annular flange member 22 that is arranged to carry a protruding offset stub shaft 23 which engages a mating aperture in the bottom of the turntable 11, thereby to key the turntable to the spindle. A threaded lug 24 also extends from the upper end of the spindle for passage through the center of the turntable. In assembled condition, the turntable is clamped down against the annular flange 22 by a acorn nut 25 that is secured to the end of the lug 24.

The turntable indexing mechanism includes a ratchet wheel 26 fixedly keyed to the lower end of the spindle 13. The ratchet wheel rotatably rests on a ratchet arm 27 that extends radially outward from the spindle and carries drive pawl 28 that is biased by a spring 29 to engage the teeth of the ratchet wheel 26. The distal end of the ratchet arm 27 includes a short, downwardly-extending pintle 30 whose lower end is pivotally connected to a drive mechanism that causes the ratchet arm to periodically move back and forth in a horizontal arc of approximately ninety degrees. The drive mechanism will be further described later herein. It can be understood from FIG. 3, however, that the turntable is indexed forward by the drive pawl 28 each time the ratchet arm 27 moves in a horizontal arc as indicated by the curve arrow. When the ratchet arm reaches the end of its travel, there is no driving force on the turntable, although the turntable has acquired a certain momentum by that time.

Preferably, the indexing mechanism further includes a "stopping mechanism" that arrests that momentum and prevents the turntable from rotating beyond certain predetermined positions for each drive stroke of the ratchet arm. More particularly, the stopping mechanism is provided to stop the turntable so that the apertures 19 (FIGS. 1 and 2) in the turntable will pause precisely at the aformentioned stations *a*, *b*, *c* and *d*. The preferred stopping mechanism includes a notched "stop" disc 31 that is keyed to the spindle 13 at a position above the spindle support collar 15. In the illustrated arrangement, the stop disc rotatably rests for support upon a horizontally-disposed bracket plate 32 which is stationarily fastened to the top 5 of the main frame. Equally-spaced notches 33 are formed in the periphery of the stop disc. The number of such notches equals the number of times the turntable is indexed to complete a full rotation; since the illustrated turntable is indexed one-quarter turn each time, there are four stop notches. A pivotal detent arm 34 is constructed and arranged on the bracket plate 32 to present a sharp edge to engage the stop notches 33, and a spring 37 is provided to normally bias the sharp edge of detent arm 34 to ride against the notched stop disc 31. The turntable 11 is prevented from rotating when the sharp edge of the detent arm 34 engages any one of the stop notches 33 in the stop disc 31.

The detent arm 34 is rigidly fixed to and pivots about the upper end of a vertically-extending crank-like "release" member 35. The upper end of the release crank passes rotatably through the bracket plate 32 and the lower or distal end 36 hangs free beneath the top 5 of the main frame. Particularly, the end 36 of the release crank is arranged adjacent a planar back edge of the ratchet arm 27.

The kinematics of the turntable indexing system can be understood by first assuming that the ratchet arm 27 has paused at the end of its drive stroke. At that position, the sharp edge of the detent arm 34 is in engagement with a notch 33 in the stop disc 31 and the turntable 11 is thusly locked into place. After a short pause, whose duration is determined by the cycling time of the later-described folding mechanism, the ratchet arm 27 begins its return travel in the direction of the dashed arrow. Near the end of the return stroke, the back edge of the ratchet arm 27 strikes the free end 36 of the crank 35 and thereby causes the detent arm 34 to disengage the stop disc 31. Thence, the pawl 28 engages the next tooth on the ratchet wheel 26 and the ratchet arm thereafter reverses direction to begin its drive stroke. As the ratchet arm continues to pivot, the crank arm 35 swings towards its initial position because of the force of the detent spring 37. Such motion continues until the drive pawl 28 ceases to contact the free end 36 of the crank and the detent arm 34 followingly rides against the stop disc. At that time, the ratchet arm 27 is near the end of its drive stroke and then the edge of the detent arm 34 engages the next notch 33 in the stop disc. Such engagement locks the turntable in place again and, thusly, insures exact and proper placement of the apertures 19. Although the preferred spindle and turntable indexing mechanism have been described in considerable detail, other mechanisms can be provided to selectively revolve the turntable without departing from the scope or spirit of the folding mechanism which is described hereinafter.

Referring again to FIGS. 1 and 2, a conveyor 38 is arranged above the turntable 11 and is operated to deposit a wafer *w* onto the surface of turntable 11 between stations *d* and *a* each time the turntable stops rotating. Then when the turntable is indexed, the wafer is positioned to fall into an aperture 19 which advances from station *d* by means of a horizontallly-extending hook-shaped arm 39 which is stationarily supported from the platform 8 and is disposed to slide on the upper surface of the turntable. The illustrated arm 39 presents an approximately concave guide edge 40 to the advancing wafers on the turntable. The arm is disposed so that the wafers move or slide into the concavity formed by the guide edge 40 as the turntable is indexed. Then, the wafer is held and positioned in the concavity until it falls into an associated aperture 19 as the turntable continues to rotate and slide beneath the wafer. Although it is preferred that the wafers be placed upon the turntable 11 automatically, the conveyor 38 is optional and the wafers can be placed on the turntable by hand at lower production rates. In any event, the wafers must reach the folding device while they are still warm and pliable. In practice it has been found that if the guide edge 40 is somewhat thicker than the wafers, then the warm wafers are not likely to become wrinkled or damaged during placement into the apertures. Preferably, the upper edges of the apertures 19 are beveled slightly so that the wafers will slip more readily thereinto.

In the preceding description, way and means have been described for accurately placing or positioning flat wafers prior to folding. It has been described, for example, how the turntable 11 and the hook-shaped arm 39 cooperate and co-act for placement of a flat wafer into one of the apertures 19, and how the turntable is cyclically indexed to position the thusly located wafers at the folding station *c*. In the following, ways and means will be described for forming the first and then the second folds in the wafers.

Figure 5:
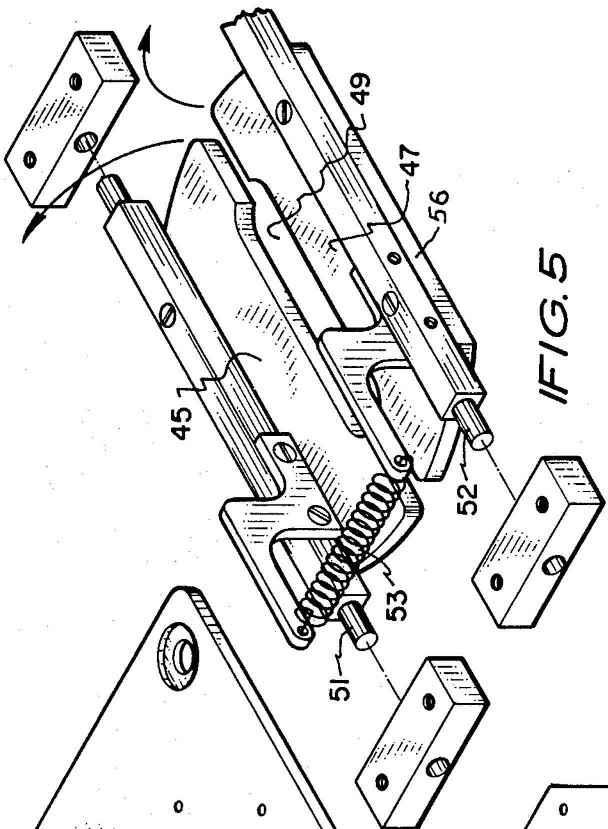
FIG. 5 is a pictorial view of a detail of a mechanism shown in FIG. 4 drawn to a further enlarged scale for purposes of clarity.

As shown in detail in FIG. 4, approximately rectangular openings 43 and 44 are formed in registry through both the support plate 21 and the platform 8 respectively, below the station *c* position of an apertures 19. A pair of elongated symetrically-shaped flat plates 45 and 47 are horizontally disposed in the platform opening 44 such that an elongated slot 49 is defined across the opening between the long edges of the two plates. The slot 49 is at least as long as the diameters of the apertures 19. The plates 45 and 47 are hereinafter referred to as "gates" and are illustrated in further detail in FIG. 5. The gates are arranged to pivot on associated shafts 51 and 52, respectively that are journaled to the platform 8. The shafts are disposed parallel to the long edges of the gates such that the slot 49 increases in width as the gates pivot from the horizontal. In other words, the gates 45 and 47 are "closed" when they are horizontal and are "open" when they are pivoted downward in the machine. A coiled tension spring 53 is associated with the gates to bias them towards the horizontal. Also, stop edges 55 and 56 are associated with the respective gates to prevent them from pivoting upward beyond the horizontal. Accordingly, the gates can pivot only within the arc encompassed by the curved arrows in FIG. 5.

Figure 6:
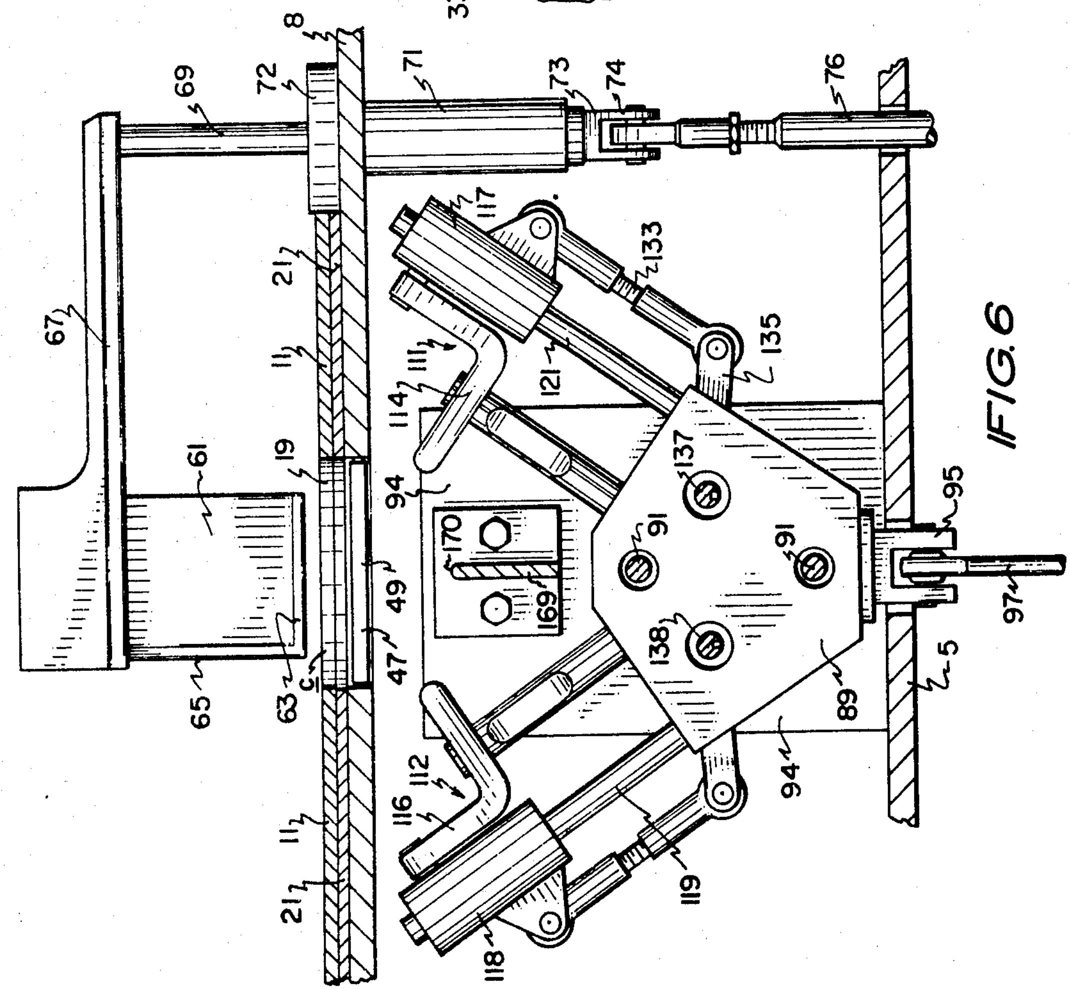
FIG. 6 is a cross-sectional view to an enlarged scale of a portion of the machine of FIG. 1 taken along the line 6—6 in FIG. 2 viewed in the direction of the arrows; some mechanisms and members are omitted in whole or in part from this view for purposes of clarity.
Figure 4:
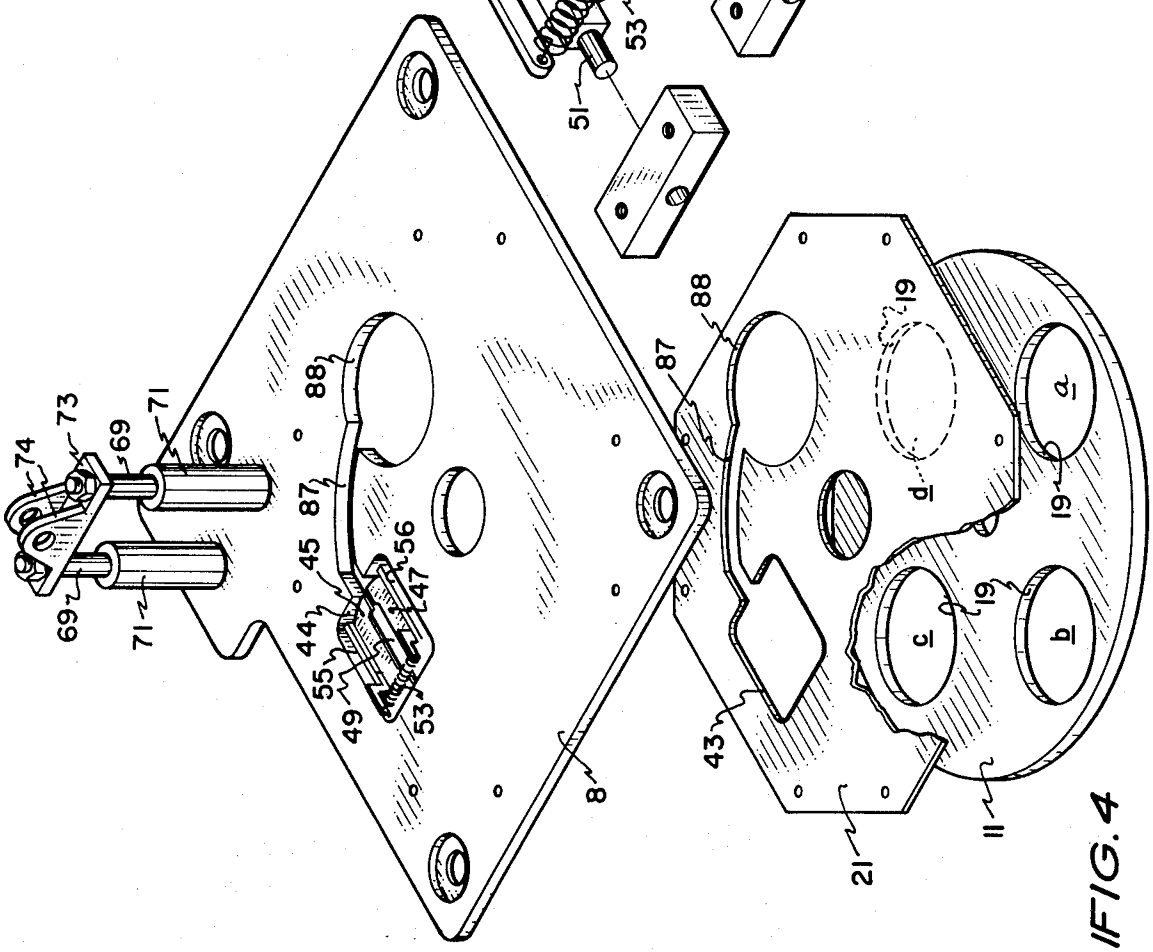
FIG. 4 is an exploded pictorial view of other details of the machine of FIG. 1, here viewed from the bottom and also drawn to an enlarged scale for purposes of clarity.

Referring now to FIGS. 1 and 6, a vertically-disposed "plunger" member 61 is mounted above station *c* and is aligned with the slot 49, which was described in conjunction with FIG. 4, for reciprocation downwardly past the aperture 19 and thence through the slot. The illustrated plunger 61 is a thin rectangular plate whose lower edge is horizontal and straight with, preferably, a slight lip 63 formed therealong. The illustrated plunger also includes an integral rib 65 formed along one of its vertical edges; the rib is narrower at the bottom than at the top so that it urges the gates 45 and 47 progressively apart as the plunger passes downward therebetween. The upper end of the plunger is rigidly supported from an arm 67 which extends past the periphery of the turntable 11 to connection with a pair of vertically-disposed rods 69 which reciprocatably drive the plunger up and down. The plunger drive rods 69 are slidably disposed in associated guide sleeves 71 and collars 72 that are fixed to the platform 8. The lower ends of the plunger drive rods extend past the guide sleeves 71 and are connected together by a yoke 73 (see FIG. 4).

Figure 10:
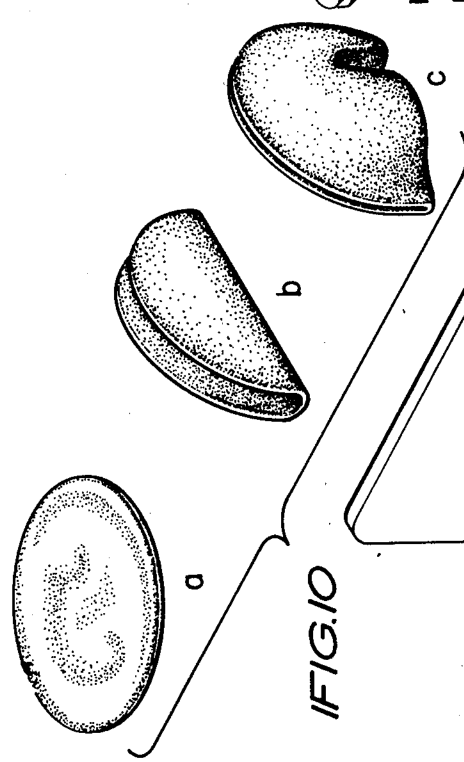
FIGS. 10*a*, 10*b* and 10*c* are pictorial views of wafers folded in various stages by the machine of FIG. 1.

To make the first fold in a wafer, the wafer is placed below the plunger at station *c* and the plunger 61 is driven downward to strike the wafer on a diameter and to followingly force the wafer through the slot 49 between the gates 45 and 47; concomitantly the vertically-disposed rib 65 on the plunger opens the gates slightly and the wafer is gently folded on its diameter so that it has a semi-circular shape. A once-foled wafer is shown in FIG. 10*b;* the bottom edge of the wafer is the socalled "first fold line". For making the first fold, the illustrated plunger is particularly effective in practice at high production rates. For example, the lip 63 on the lower edge of the plunger has been found particularly in practice to minimize injuries to the wafers. Likewise, the tapering vertical rib 65 is particularly beneficial in practice to the achievement of a gentle first fold at high production.

Figure 7:
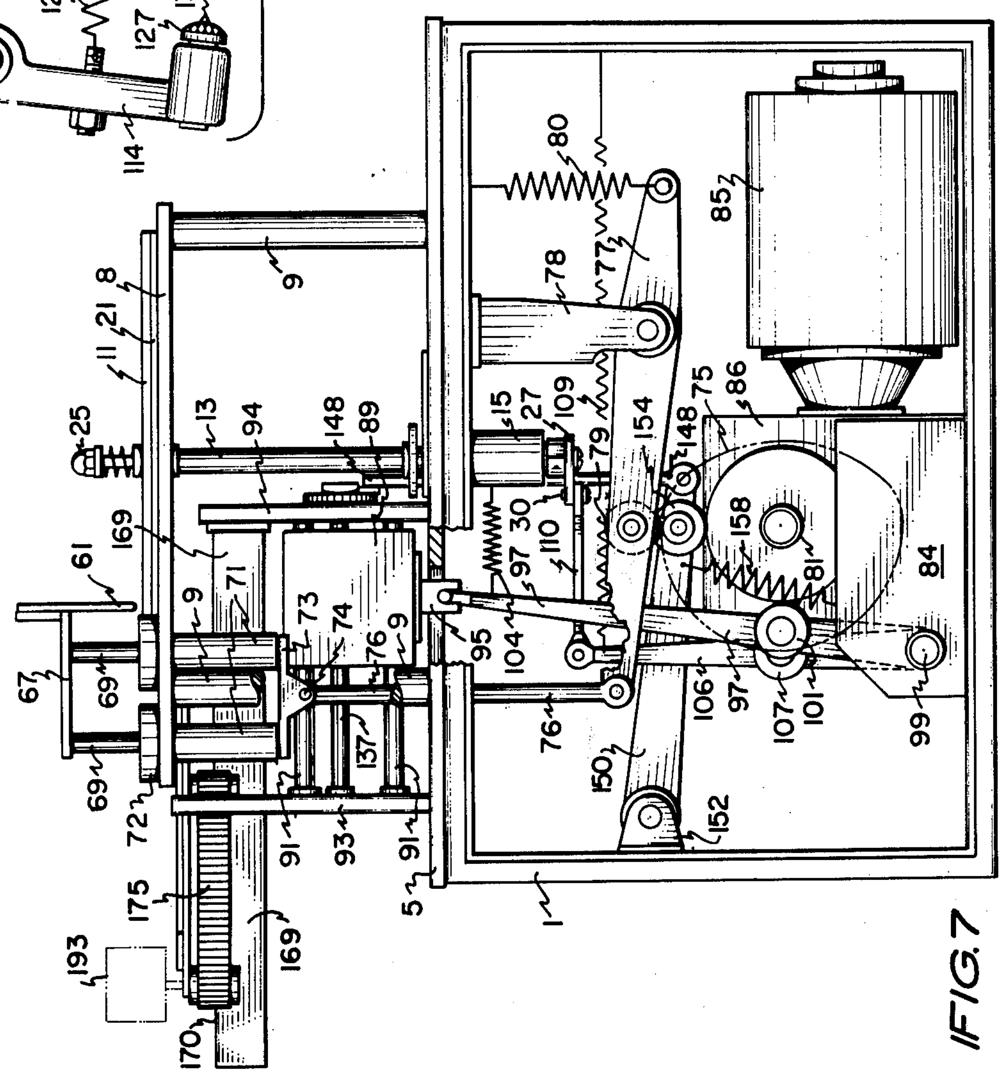
FIG. 7 is an elevational view of the machine of FIG. 1 viewed from the right-hand side.
Figure 8:
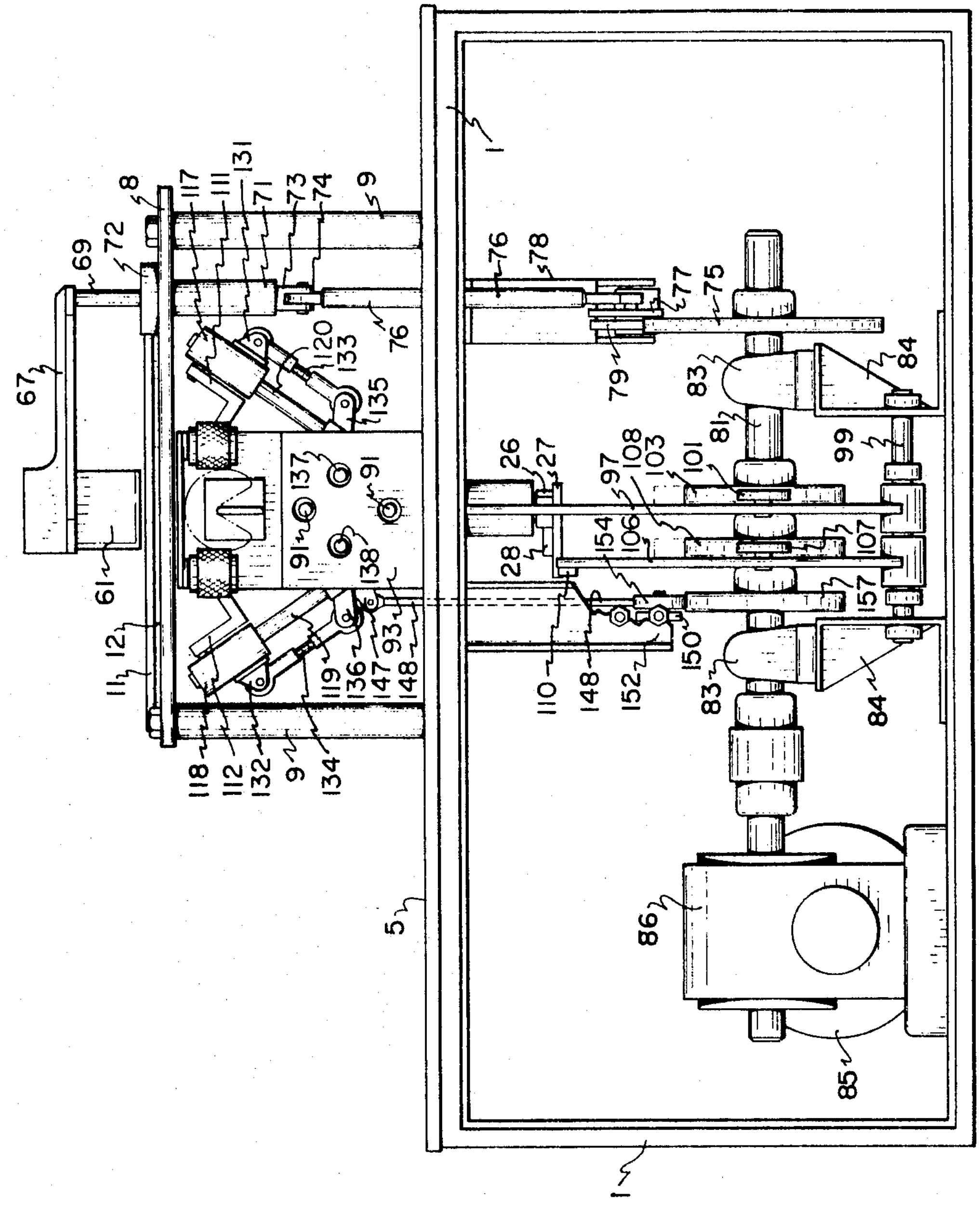
FIG. 8 is a front elevational of the machine of FIG. 1 with the protective panels removed.

Referring now to FIGS. 7 and 8, the actuating mechanism for the plunger drive rods will be described. In those drawings, it can be seen that the yoke 73 which connects the plunger drive rods 69 includes an integral clevis 74 that is pivotally fastened to a generally vertical link 76. At its lower end the link 76 is pivotally connected to a generally horizontal arm 77 which is, in turn, connected to pivot in a vertical plane from a fulcrum member 78 that is fixedly supported from the main frame 1. A rotatable wheel 79 is mounted on the arm 77 between the fulcrum 78 and the vertical link 76 in position to ride on the cam 75. Finally, a tension spring 80 is attached between the free end of the arm 77 and the frame 1 to bias the wheel 79 against the cam 75. In operation, the previously described linkage follows the cam 75 to move in a vertical plane and to, followingly, actuate the rods 69 to reciprocate vertically. It should be understood however, that the illustrated linkage and cam arrangement is exemplary only and that other arrangements could be provided to reciprocatively drive the plunger 61.

As shown in FIG. 8, the aforementioned cam 75 is one of several which are adjustable arranged on a horizontally-disposed camshaft 81 that is supportably journaled for rotation in pillow blocks 83 stationarily fixed to spaced-apart pedistals 84 that extend upward from the main frame. The cam shaft 81 is driven to rotate by an electric motor 85 which is connected to the shaft by a gear reduction box or transmission 86. Other conventional coupling means such as a chain-and-sprocket assembly, could optionally be used. The cams on the camshaft 81 provide the timing for other moving parts of the machine as will be explained further hereinafter. The exact configuration and eccentricities of the cams is a matter of conventional machine design.

As shown in FIG. 4, the platform 8 and the support plate 21 preferably include an arc-shaped slot 87 formed therethrough which extends from the opening 43 below station *c* in a circumferential direction toward a large aperture 88 formed below station *d*. The slot 87 is called the "abort" slot and it is provided so that wafers which unsuccessfully folded the first time are automatically removed from the folding station *c* as the turntable indexes. In other words, wafers are occasionally not fully pushed through the gates 45 and 47 and not properly positioned to be grasped by the means which make the second fold. In such a case, a portion of the wafer projects into the station *c* aperture in the turntable and, as the turntable is indexed, the edge of the turntable shoves the improperly folded wafer away from the folding station along the abort slot 87. Thereafter, the wafer falls into the reject opening 88 for disposal. Thus, an improperly folded wafer is prevented from interfering with the folding of subsequent wafers. The abort slot has proven in practice to be a very desirable feature, especially for high production rates, since it nearly eliminates machine shutdowns for removing defectively folded wafers.

Figure 9:
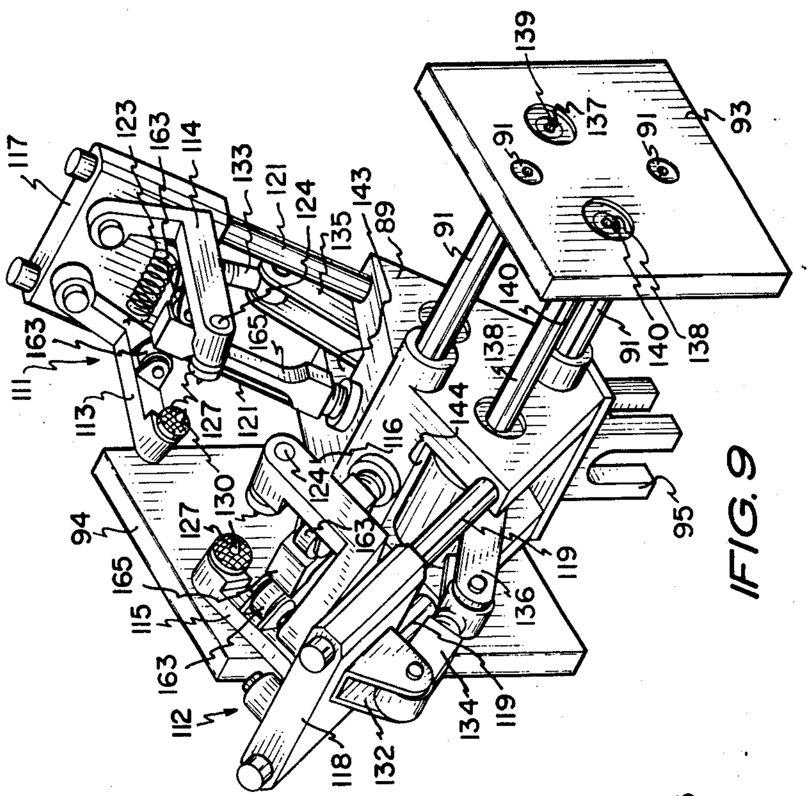
FIG. 9 is a pictorial view of a particular mechanism of the machine of FIG. 1, the mechanism being drawn to an enlarged scale for purposes of clarity.

As shown best in FIGS. 6, 7 and 9, a block-like "shuttle" 89 is mounted beneath the turntable 11 to slidably reciprocate along a pair of parallel guide rails 91 which are horizontally supported, one above the other, to extend in a direction perpendicular to the plane of the plunger 61. More particularly, the shuttle guide rails 91 are stationarily supported at opposite ends from bracket plates 93 and 94 fixed to the top 5 of the main frame. The shuttle 89 moves to-and-fro horizontally on the guide rail 91 from a position immediately below the folding station *c* to a position linearly displaced therefrom.

In FIGS. 6, 7 and 8, a mechanism for reciprocating moving the shuttle includes a joint member 95 which is fixed to the underside of the shuttle 89 immediately beneath the lower one of the guide rails 91. A generally vertically-disposed operating arm 97 is connected at its upper end to the joint member 95 for both pivotal and limited vertical movement. At its lower end, the operating arm 97 is connected for rotation about a horizontal axle 99 that, in the illustrated arrangement, extends between the spaced-apart pedistals 84 which also support the camshaft bearings. On the operating arm 97, a rotatable wheel 101 is mounted at a position to ride against a cam 103 which is keyed to the camshaft 81. The arm 97 is biased towards the cam 103 by a coiled tension spring 104. As the cam 103 turns, the cam lobe forces the operating arm 97 to pivot in a vertical plane, which followingly forces the shuttle 89 to move horizontally away from its initial position below station *c*. Maximum displacement of the shuttle occurs when the wheel 101 runs on to the high point of the cam 103. As the cam 103 continues to turn beyond the high point, the shuttle reverses direction and is pulled back towards its initial position below station *c* by the coil spring 104. It should be appreciated, however, that the illustrated shuttle drive arrangement is exemplary only and that other effective drive mechanism could have been provided. For example, the shuttle could have been driven by a properly timed electric solenoid or by a pneumatic piston-and-cylinder assembly.

The aforementioned drive mechanism for the turntable indexing system can also be understood by reference to FIGS. 7 and 8. In those drawings, an operating arm 106 is generally vertically disposed and is pivotally fastened at its lower end to the aforementioned horizontal axle 99. A follower wheel 107 is mounted on the operating arm to ride against a drive cam 108 that is adjustably keyed to the camshaft 81. The operating arm 106 is biased against the cam by a tension spring

109 that is fastened between the arm and the main frame. A generally horizontally extending link 110 is pivotally connected between the upper end of the operating arm 106 and the lower end of the aforementioned pintle 30 that, in turn, is connected to the ratchet arm 27 of the turntable indexing system shown in FIG. 3. As the drive cam 108 is rotated, the operating arm is forced to swing in a vertical plane and that motion is transmitted, by the connecting link 110, to the ratchet arm 27 to cause it to pivot in the horizontal arc that was mentioned earlier.

The shuttle 89 supportively carries two pairs of pincers, designated 111 and 112, respectively in FIG. 6 and 8. Generally speaking, the pincers function to grasp a once-folded wafer at opposite ends of the first fold line and then move to fold the wafer a second time. As shown in detail in FIG. 9, each pair of pincers includes two generally L-shaped members 113–116, respectively, hereinafter sometimes referred to individually as "pincers". Associated pincer of the two pairs are mounted side-by-side in generally vertical parallel planes. The shanks or legs of the associated pincers extend upwardly at an angle of 30° to 45° from the horizontal and are connected at their upper ends to common collar members 117 and 118 respectively, so that the associated pincers can pivot towards and away from one another. For the illustrated arrangement, the axes of rotation for the pincers are parallel to the plane of the plunger 61, the pincers pivot generally perpendicular to the plane of the plunger 61. The collars 117 and 118 are slidably mounted on associated pairs of parallel guide shafts 119 and 121, respectively, which fixedly extend upwardly in divergent directions from opposite sides of the aforementioned shuttle 89. More particularly, the shafts and collars are disposed so that the feet of the L-shaped pincers extend upward at an angle from the horizontal of about 30° to 45°. The associated pincers of the pairs 111 and 112 are connected by tension springs 123 which urge the associated pincers towards each other.

On the tips of the feet of the associated L-shaped pincers, button-shaped gripping members 127 are mounted to face one another. These "buttons" actually are the jaw pieces of the pincers; their faces are preferably convex and can be slightly striated to enchance their grip. The illustrated gripping buttons are connected by rotatable stems 124 to the respective pincers. The rotational freedon of the buttons allows the wafers to rotate as the pincers are moved and, accordingly, assure that the wafers are not torn while making the second fold as will be explained further hereinafter. Preferably, narrow pin points 130 extend centrally from each of the gripping buttons; in operation, those pin points actually pierce the once-folded wafers slightly when the wafers are grasped by the pincers. However, the pierce marks "heal" when the wafers are released and are nearly imperceptable in the final product.

The two aforementioned collars 117 and 118 are connected, by clevis brackets 131 and 132 fixed to the backs of the respective collars, each to associated operating mechanism which reciprocatably slide the collars simultaneously along the associated guide shafts 119 and 121. The illustrated operating mechanisms include adjustable links 133 and 134 that are pivotaly connected to the respective associated collars. Second links 135 and 136 are pivotally fixed respectively to the first links 133 and 134 and are also keyed to respective horizontally-disposed "key" shafts 137 and 138. The sides of the key shafts have long grooves 139 and 140, respectively, formed therein. The linkages 135 and 136 are keyed into those respective grooves and, also, are slidable along the respective shafts. The linkages 135 and 136 work in large recesses 143 and 144 formed on opposite sides of the shuttle. With the illustrated arrangement, the pincer linkages are able to pivot even as the shuttle is moving back and forth on the guide rails 91.

Figure 14:
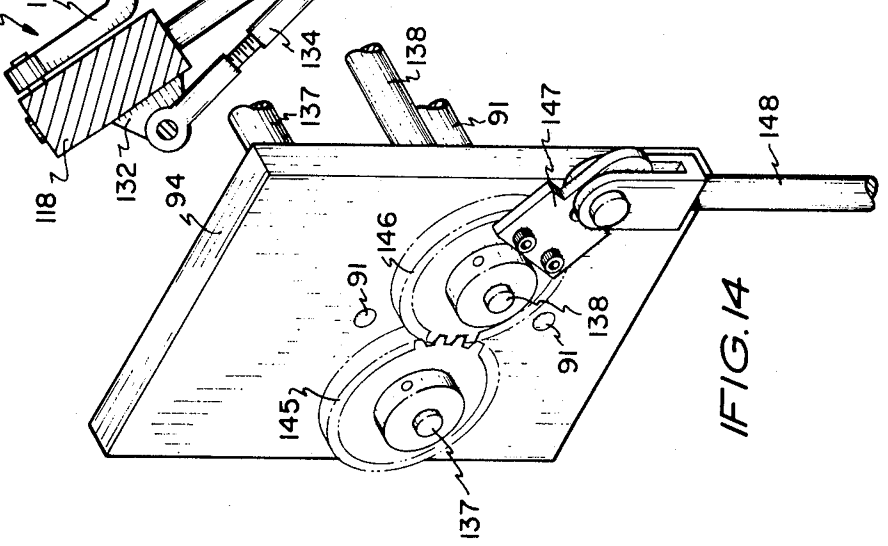
FIG. 14 is a pictorial view of another particular mechanism of the machine of FIG. 1, the mechanism being drawn to an enlarged scale relative to FIG. 1 for purposes of clarity.

The two key shafts 137 and 138 are journaled for rotation in parallel, horizontally-extending channels formed through the shuttle 89. The opposite ends of the key shafts are rotatably supported by the respective bracket plates 93 and 94. By rotating the key shafts 137 and 138 through preselected angles, the associated linkages are pivoted to drive the collars 117 and 118 to followingly reciprocate along the guide shafts 119 and 121. (When the key shaft 137 is rotated clockwise in FIG. 8, for example, the collar 117 moves downwardly.) The key shafts need only rotate a few degrees to force the collars to travel the full length of the guide shafts. In practice, the two key shafts 137 and 138 are rotated simultaneously and equally, but in opposite directions. In FIG. 14, a mechanism for selectively rotating the key shafts 137 and 138 includes a pair of circular spur gears 145 and 146 that are keyed concentrically to the respective shafts 137 and 138 on the back face of the inner bracket plate 94. The spur gears mesh together for simultaneous rotation in opposite directions. A short lever arm 147 extends radially from the spur gear 146 and is pivotally connected to the upper end of a generally vertically-disposed operating rod 148. As shown in FIGS. 7 and 8, the lower end of the rod 148 is pivotally connected to a generally horizontal arm 150. The horizontal arm is arranged to work in a verticala plane from a fulcrum bracket 152 that is fixedly supported from a side of the main frame 1. A rotatable wheel 154 is mounted on the horizontal arm 150 to ride on a cam 157 that is adjustably affixed to the aforementioned camshaft 81. Preferably, a tension spring 158 is connected between the horizontal arm 150 and the main frame 1 to bias the arm, and hence the cam-following wheel 154, against the lobe of the cam 157. The cam 157 is sometimes referred to as the pincer drive cam since it ultimately drives the pincer pairs 111 and 112. That is to say, rotation of the cam 157 causes the linkage 150, 148 and 147 to move followingly in a vertical direction which, in turn, rotates the spur gears 145 and 146; as was previously described, rotation of those gears reciprocatively drives the pincer pairs 111 and 112.

The aforementioned pincer operating mechanism further includes rollers 163, FIG. 9, that are rotatably mounted at the vertices of each of the L-shaped pincer members. In other words, a pair of associated rollers face each other on each of the pincer pairs 111 and 112. The rollers are urged towards one another by the aforementioned coil springs 123. Two "linear cam" members 165 fixedly extend from opposite sides of the shuttle 89 between each of the pairs of pincers and are also a cooperative part of the pincer operating mechanism. The linear cams 165 are elongated members which are contoured so that their width varies somewhat abruptly along their length. More particulary, both ends of the linear cams are relatively wide and their middle sections are relatively thin or slender. The linear cams extend parallel to the respective guide shafts 119 and 121 between the pincer pairs and are arranged so that the rollers on the pincers follow the contours of the linear cams as the pincer collars 117 and 118 travel on the associated guide shafts.

Figure 11:
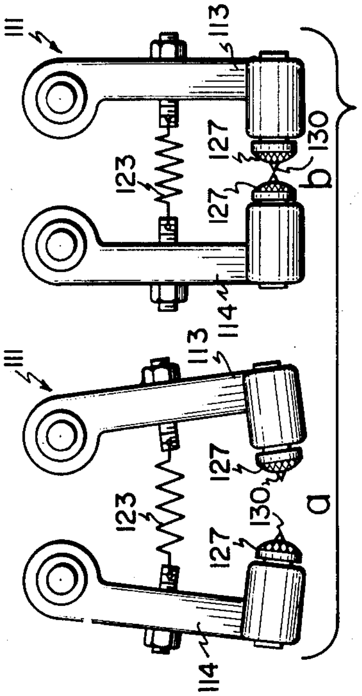
FIGS. 11*a*, 11*b*, 12*a* and 12*b* are "floating" details of a particular mechanism included in the machine of FIG. 1 showing the motion of that mechanism.
Figure 12:
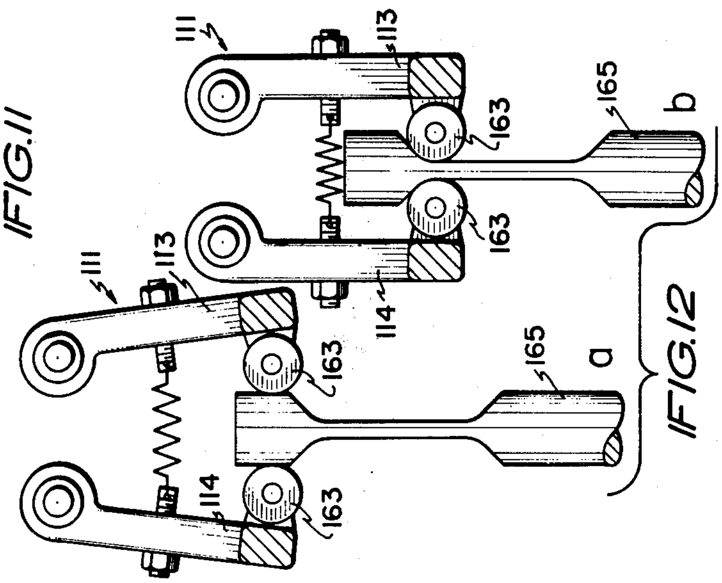

The action of the pincers in cooperation with the linear cams is best understood by referring to FIGS. 11 and 12 wherein the single pincer pair 111 is shown in various positions. When the rollers 163 are on slender portions of the linear cams 165 (FIG. 12_b_), the jaws 127 of the pincers are forced relatively close together by the tension springs 123 (FIG. 11_b_). When the rollers are on the thicker upper or lower ends of the linear cam (FIG. 12_a_), the pincer jaws are wedged relatively further apart (FIG. 11_a_). To operate the folding machine, the linear cams are arranged such that when the pincers move downward and towards one another, the jaws concomitantly move to grip a once-folded wafer at opposite ends of the first fold line. In other words, the pincers pinch the "corners" of the semi-circularly shaped once-folded wafers and hold the sides together. With the once-folded wafer thusly held, the plunger 61 can be retracted without damage to the once-folded wafers and without the wafers unfolding.

As shown in FIGS. 6 and 7, a horizontal stationary bar 169 is mounted above the shuttle 89. The bar has a long straight upper edge 170 that extends outwardly from the rear bracket plate 94 parallel to the shuttle guide rails 91. More particularly, the bar 169 extends through the space between the two pairs of pincers 111 and 112 and is disposed perpendicular to the plane of the once-folded wafer below the mid-point of the first fold line. Generally speaking, the second fold in a wafer is made when the pincers move simultaneously downward and toward one another to carry a once-folded wafer against the edge of the bar 169. Preferably, the upper edge 170 of the bar 169 is slightly rounded so that the wafers are not cut during the second fold. In the illustrated arrangement, the distal end of the bar 169 extends well beyond the periphery of the platform 8 for purposes that will be explained later.

The process by which a flat wafer is twice folded to form a fortune cookie will now be summarized. First, the flat wafer is positioned horizontally at station _c_. Then, the plunger 61 is driven downwardly across a diameter of the wafer pushing it through the slot 49 between the gates 45 and 47. As the wafer passes between the gates, it is folded on its diameter to have a semicircular shape. By the time the first fold is complete, the wafer is located beneath the turntable 11. At that time, the pincers pairs 111 and 112 are positioned adjacent and slightly above the ends of the first fold line and are fully open. (In other words, the pincers are in their upwardmost position as shown in FIGS. 11_a_ and 12_a_.) Just as the plunger 61 reaches the bottom of its stroke, the pincer pairs are actuated and begin to move downwardly and towards one another. When the rollers 163 on the pincers reach the narrow sections of linear cams 165, the jaws 127 of the pincers move quickly together to securely grasp the once-folded wafer at opposite ends of the first fold line. After the pincer jaws have grasped the wafer, the pincers continue to move further downward and toward one another, carrying the once-folded wafer with them. The long edge 170 of the horizontally-extending bar 169, however, lies stationarily between the pincer pairs immediately beneath the midpoint of the first fold line of the once-folded wafer. Thus, as the pincers move downwardly, the midpoint of the first fold line is brought against the stationary edge 170 and a second fold is initiated and followingly made around that edge 170. The continuing convergent motion of the pincer pairs completes the second fold as the corners of the once-folded wafers are brought towards one another. (A twice-folded wafer is shown in FIG. 10*c*.) While the second fold is being made, the partially-folded wafer can pivot slightly between the jaws 127 on the pin-points 130; such freedon of motion further prevents damage to the wafers during folding. In the illustrated device, the second fold is made at the same time that the shuttle 89 is moving away from its initial position beneath station *c*. After the second fold is complete and as the shuttle reaches the end of its travel, the wafers are released. To effect such release, the pincer collars 117 and 118 are driven downward still further so that the rollers 163 ride onto the wide lower ends of the linear cams and, thusly, the pincer jaws 127 are wedged apart. Thereafter, the twice-folded wafer is discharged from the folding machine by a mechanism which will now be described.

Figure 2:
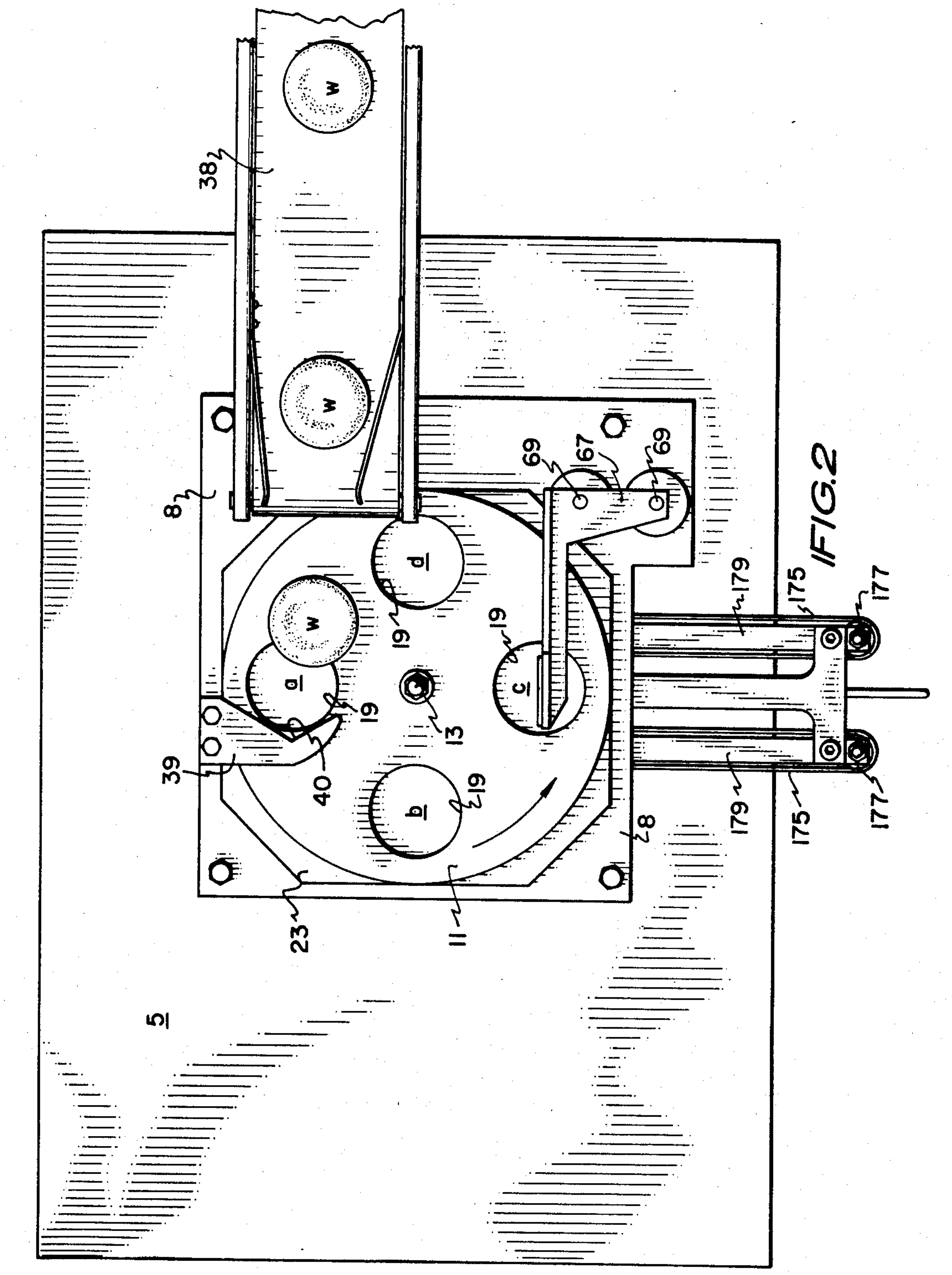
FIG. 2 is a plan view of the machine of FIG. 1.

The preferred mechanism for discharging the twice-folded wafers is shown best in FIGS. 1 and 2. That mechanism includes a pair of juxtaposed endless belts 175 which extend, in spaced apart relationship, generally horizontally from beneath the platform 8 substantially parallel to the folding bar 169. More particularly, the belts are trained over vertically-disposed rollers 177 that are supported by structural members 179 that stationarly extend in parallel from the platform 8. At the platform, the support rollers 177 are arranged so that the shuttle 89 carries the twice-folded wafers into a "loading" location between the two belts. Preferably, the rollers 177 are arranged so that the belts are somewhat further apart at the platform than at the far or "discharge" end. In the loading location, the wafers are gripped on edge between the belts and are supported from below by the folding bar 169 whose edge 170 they straddle as they move with the belts to discharge. The surfaces of the belts preferably are fairly rough to enhance their grip on the wafers. In practice, the belts actually begin their parallel travel just as a twice-folded wafer is released by the pincers and, because the pincer jaws move below the twice-foled wafers in their release motion, the pincer jaws do not interfere with the belts. With the belts arranged to move progressively closer together towards the discharge end, the second fold is actually emphasized as the twice-foled wafers are being discharged. At high production rates, the belts are preferably driven simultaneously by motors 193; at lower rates, subsequently folded wafers will shove preceding ones along between the belts and the motors are not needed.

Figure 16:
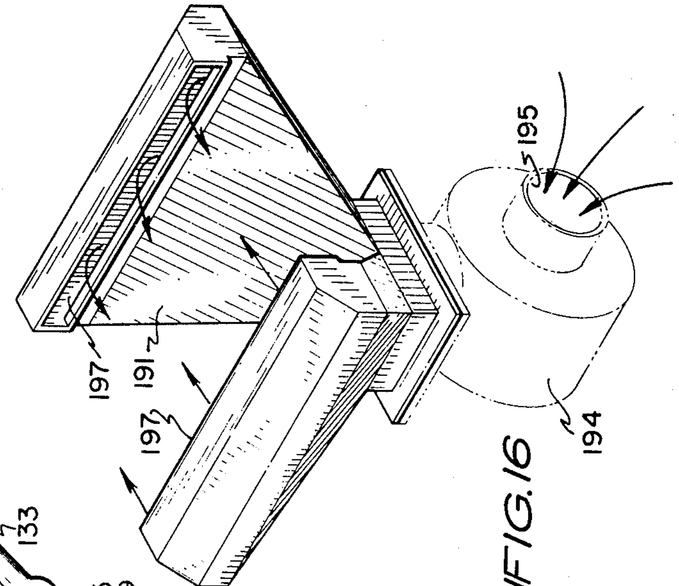
FIG. 16 is a pictorial view of another device for use in conjunction with the machine of FIG. 1.
Figure 15:
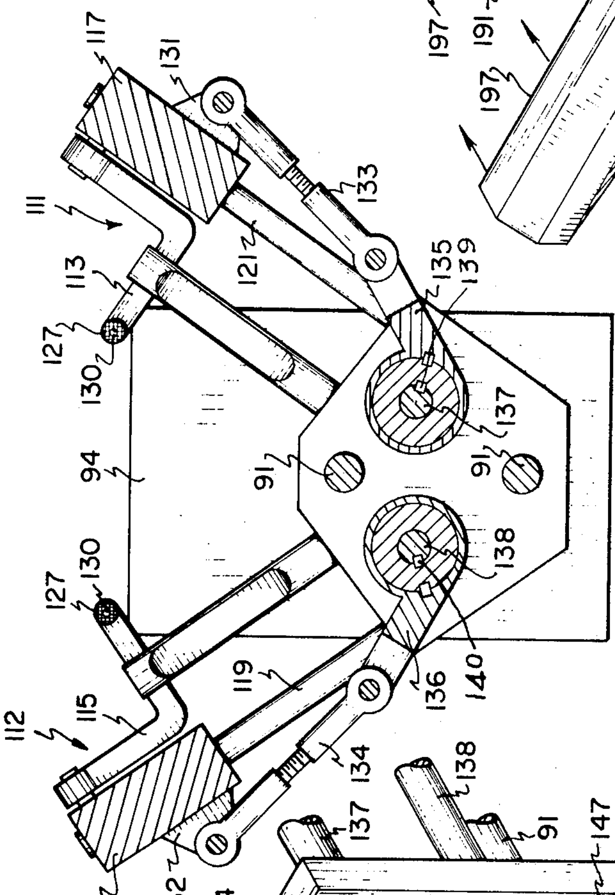
FIG. 15 is a cross-sectional view taken in the plane of the line 15—15 in FIG. 9 for viewing in the direction of the arrows.

In FIG. 16, an auxillary cooling device 191 is shown that preferably is utilized when the folding machine is operated at high production rates, say when two-thousand wafers or more are folded per hour. The illustrated cooling device includes a conventional centrifugal-type electric fan 194 having a central air inlet 195 and an elongated outlet neck 197 that is especially designed to extend over the belts 175 to direct cooling air against the twice-folded wafers as they travel to discharge. The illustrated cooling fan is releasably mounted on top 5 of the main frame so that it can be conveniently moved out of the way when not in use.

Figure 13:
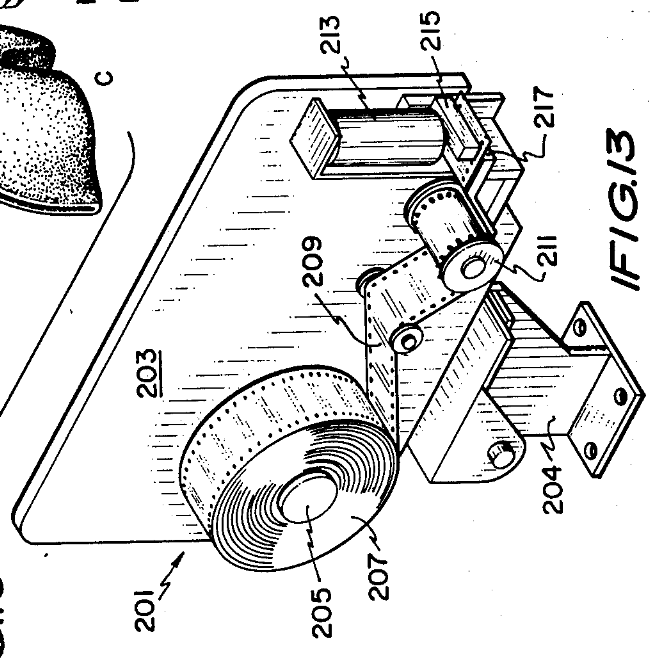
FIG. 13 is a pictorial view of one embodiment of a device for use in conjunction with the machine of FIG. 1.

In FIG. 13 there is shown a device, designated 201, for placing fortune slips on the flat wafers before folding. In the assembled system, the slip placement device is mounted to extend over station *b* where the wafers first pause after they have been located in the apertures 19 in the turntable 11. The illustrated slip placement device has a frame member 203 that is fixed to a pedistal 204 mounted to the top 5 of the main frame. A rotatable hub 205 is mounted on the member 203 to hold a roll 207 of thin paper on which fortunes are printed transversely at spaced intervals. In practice, there are several thousand fortunes printed on the paper strip 209 which is wound into the roll 207. The width of the strip 209 should be less than the diameters of the wafers. Preferably, at least one edge of the strip is perforated and the slip placement device includes a sprocket wheel 211 which is arranged to engage the perforations to selectively unwind the roll. In practice, the sprocket wheel is driven by a small motor (not shown) which is energized intermittantly to rotate the sprocket in synchronization with rotation of the turntable. In other words, whenever the turntable rotates, the sprocket wheel advances the strip 209 slightly from the roll 207. Such synchronization can be readily achieved by mounting a limit switch (not shown) at a position for acutation by one of the moving mechanical parts of the machine.

The illustrated strip placement device further includes a vertically-disposed electrical solenoid 213 which is arranged on the plate 203 directly over station *b*. The solenoid is constructed and arranged so that its core moves quickly downward when the coil is energized and returns to an elevated position when the coil is de-energized. The lower end of the core carries a shape-edged shearing member 215 which is disposed for downward movement past a sharp edge on a second shearing member 217 over which the leading edge of the fortune strip 209 extends. Whenever a wafer pauses at station *b*, the solenoid is energized so that the shearing members cut the narrow extending slip from the leading edge of the fortune paper strip. The downward motion of the solenoid's core carries the slip exactly across a diameter of the wafer.

Actuation of the solenoid can also be governed by the motion of a limit switch or the like. Further, a photosensitive cell or the like can be provided to inhibit operation of the slip inserting device unless a wafer is properly positioned at station *b*. In any event, the shearing solenoid 213 is energized only after the sprocket wheel 211 has advanced the leading edge of the fortune strip over the lower cutting member 217. Such sequential operation is readily achieved by various delay devices for example.

We claim:

1. A method for folding flat circular wafers into the shape characteristic of fortune cookies comprising the steps of:
   a. folding a wafer once along a diameter by urging the wafer through a slot-like opening by means of a reciprocating plunger so that a semicircularly-shaped article is formed;
   b. then grasping the once-folded wafer at opposite ends of the first fold line with the jaws of two pairs of pincers; and
   c. then moving said pincers towards one another and towards and edge that is arranged to extend perpendicular to the plane of the once-folded wafer so that the midpoint of the first fold line is forced against said edge and, followingly, a second fold is made about said edge so that the twice-folded wafer has the shape characteristic of a fortune cookie.

2. The method of claim 1 further including the step of continuing the direction of travel of said pincer means after second fold is made and, concomitantly, releasing the grasp of said jaws on the twice-folded wafer.

3. The method according to claim 2 further including the step of carrying the twice-folded wafers to discharge by gripping the wafers on edge between a pair of juxtaposed endless belts that are arranged to travel to the discharge location.

4. The method according to claim 1 further incuding an initial step of carrying a flat wafer in one of a plurality of apertures formed in a rotatable turntable to a position directly over said slot-like opening.

5. The method according to claim 4 further including an initial step of locating the flat wafer in said aperture by an arm that is constructed and arranged to slide over the surface of said turntable and to present a concave edge to a wafer on the turntable that guides the advancing wafer into a position to fall into one of said apertures which move under said arm as said turntable rotates.

* * * * *